(12) United States Patent
Steiner et al.

(10) Patent No.: US 12,456,106 B2
(45) Date of Patent: Oct. 28, 2025

(54) RETAIL RESOURCE MANAGEMENT ALLOCATION SYSTEM

(71) Applicant: Toshiba Global Commerce Solutions, Inc., Durham, NC (US)

(72) Inventors: David John Steiner, Durham, NC (US); Craig Compton, Wake Forest, NC (US); Daniel Hunt, Wake Forest, NC (US); Wan-Chen Tsai, New Taipei (TW); Roberto Cabral Frias, Jalisco (MX)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 413 days.

(21) Appl. No.: 18/154,259

(22) Filed: Jan. 13, 2023

(65) Prior Publication Data

US 2024/0242193 A1    Jul. 18, 2024

(51) Int. Cl.
*G06Q 20/20*    (2012.01)
*G06T 7/70*    (2017.01)
*G06V 20/40*    (2022.01)

(52) U.S. Cl.
CPC ............. *G06Q 20/202* (2013.01); *G06T 7/70* (2017.01); *G06V 20/44* (2022.01); *G06T 2207/30196* (2013.01)

(58) Field of Classification Search
CPC .... G06Q 20/202; G06Q 20/20; G06Q 20/208; G06T 7/70; G06T 2207/30196; G06V 20/44; G06V 20/52; G06V 40/16; G06V 10/82; G06N 3/045; G06N 3/08; G06N 20/20; G06N 20/00; G07G 1/0036; G07G 1/0063; G07G 1/0054; G07G 1/0072

USPC ........................................................ 705/21
See application file for complete search history.

(56) References Cited

U.S. PATENT DOCUMENTS

| | | | |
|---|---|---|---|
| 9,817,682 B2 | 11/2017 | Rencs | |
| 10,146,593 B2 | 12/2018 | Gong et al. | |
| 2020/0043086 A1* | 2/2020 | Sorensen | G06Q 30/0631 |
| 2021/0103941 A1* | 4/2021 | Patil | G06V 40/161 |
| 2021/0194821 A1 | 6/2021 | Guim Bernat et al. | |

(Continued)

OTHER PUBLICATIONS

Mohammadi, Mehdi et al. Deep Learning for IoT Big Data and Streaming Analytics: a Survey. IEEE Communications Surveys and Tutorials, vol. 20, No. 4, Fourth Quarter 2018. (Year: 2018).*

(Continued)

*Primary Examiner* — Fawaad Haider
(74) *Attorney, Agent, or Firm* — Stanek Lemon Crouse & Meeks, PA.

(57) ABSTRACT

The present disclosure utilizes excess processing capacity of a point of sale (POS) system by dynamically managing assigned tasks based on an expected activity of an individual. A resource management system can use image data and a trained neural network to analyzes aspects of an appearance or a behavior of the individual as captured in the image data to quantify a likelihood of the individual participating in a checkout procedure. The resource management system can dynamically allocate resources across different POS systems in anticipation of expected activity. This allows for the efficient use of the POS systems' resources while maintaining good system performance and a positive experience.

17 Claims, 4 Drawing Sheets

(56) References Cited

U.S. PATENT DOCUMENTS

2023/0169612 A1* 6/2023 Liguori .................. G06N 20/00
705/15

OTHER PUBLICATIONS

Xia, Kun et al. An Intelligent Self-Service Vending System for Smart Retail. Sensors, 2021. (Year: 2021).*

* cited by examiner

RETAIL RESOURCE MANAGEMENT ALLOCATION SYSTEM

BACKGROUND

Intelligent computing solutions, such as artificial intelligence and visual compute solutions, have the potential to significantly improve capabilities in a retail environment. However, implementing these solutions across existing point-of-sale (POS) systems can be complex due at least to performance or user experience constraints.

Figure 1:
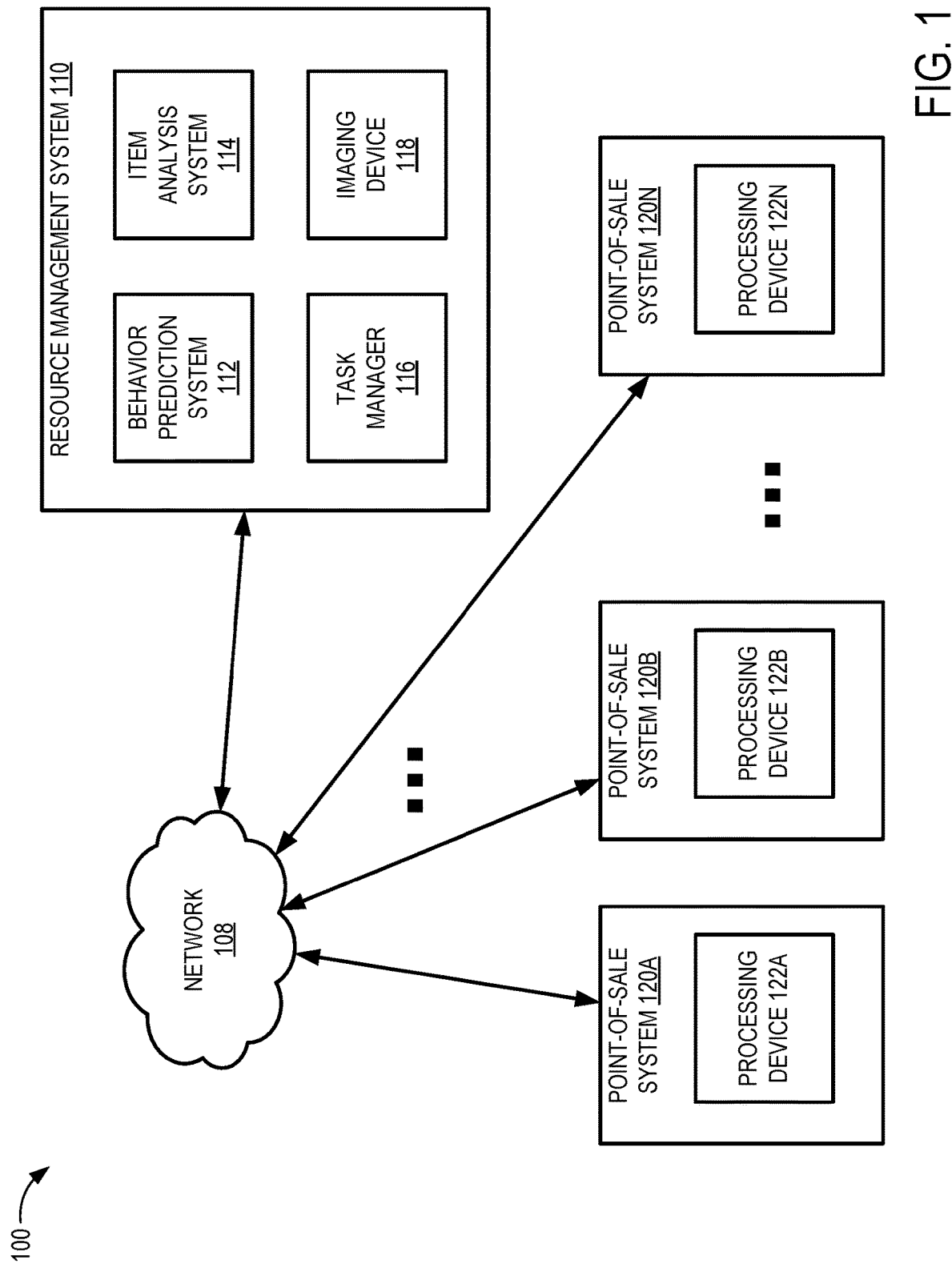
FIG. 1 illustrates an embodiment of a retail environment.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

In the present disclosure, reference is made to a "Point-Of-Sale (POS) system." As used herein, the term "POS system" refers to any system that is used to process transactions at a retail store or other location, including self-checkout (SCO) systems where individuals can scan, pay for, or bag their own items. POS systems are used for a variety of purposes, such as completing transactions, processing returns, or handling inquiries. POS systems can be found in a variety of settings, including brick-and-mortar retail stores, online stores, or mobile environments.

In the present disclosure, reference is made to a "checkout procedure." As used herein, the term "checkout procedure" is used broadly to refer to any part of a process for carrying out a transaction at a retail location, such as on a POS system. The steps involved in a checkout procedure may vary depending on the retailer or the type of POS system being used. For example, a checkout procedure can include, but is not limited to, scanning a loyalty card, scanning items, weighing the items, obtaining item dimensions, processing a payment for an item, or printing or emailing a receipt. Checkout procedures can be carried out by a human cashier or a self-checkout machine.

In the present disclosure, reference is made to "checkout-related tasks" and "non-checkout-related tasks." As used herein, the term checkout-related task broadly can refer to any computing job or isolated execution environment that is related to the checkout procedure. In some cases, checkout-related tasks may be essential to the functioning of the checkout procedure on a POS system. However, in some cases, checkout-related tasks may include non-essential tasks. In some cases, checkout-related tasks may be tasks typically performed by that system, such as those related to scanning a loyalty card, scanning items, weighing items, obtaining item dimensions, processing a payment, or printing or emailing a receipt. The term non-checkout-related task can broadly refer to any other task. Non-checkout-related tasks may refer to any task that is non-essential or not directly related to the checkout procedure, or not typically performed by the POS system. These tasks may still be related to the checkout procedure, but at a lower level or in a less direct way. For example, a non-checkout-related task may include implementing intelligent computing, such as the use of artificial intelligence (AI) and visual computing technologies to solve complex problems, analyze large amounts of data, and make decisions or predictions. In some cases, checkout-related tasks do not include tasks related to intelligent computing.

Overview

POS systems are commonly used in the retail industry to facilitate transactions and enable individuals to complete sales or other transactions. These systems often include a central processing unit (CPU) to handle various tasks required for the checkout procedure, such as scanning items, searching for information associated with the items, or weighing the items. During periods of low or no usage, the POS system may have excess processing capacity available. For example, the CPU of the POS system may not be fully utilized during these times. The inventive concepts described herein take advantage this excess processing capacity to perform additional tasks or workloads, such as non-checkout-related tasks that do not require immediate processing or that can be completed at a lower priority. By efficiently utilizing the excess processing capacity of the POS system, the inventive concepts described herein improve the overall efficiency and performance of the POS systems, as well as to add new capabilities or features, while maintaining a good user experience and system performance.

Intelligent computing solutions have become popular in the retail industry for various purposes, including enhancing system capabilities and improving the individual's experience. These solutions use advanced computing techniques to provide valuable insights and benefits. One example of such a solution is the use of a trained neural network model to facilitate produce recognition during a checkout procedure, which can streamline the checkout procedure and improve item information accuracy. Intelligent computing solutions are often run on specialized processing systems, which can be expensive or require a large amount of physical space. Alternatively, these solutions can be run on cloud processing systems, which can be costly or slow. The inventive concepts described herein enable the distribution of intelligent computing tasks or other non-checkout-related tasks across existing CPUs in retail settings, such as the CPUs of POS systems. This advantageously increases efficiency and reduces costs, while also utilizing idle CPU time effectively. As a result, retailers can benefit from advanced computing capabilities without incurring additional hardware expenses.

In at least one example, the present disclosure utilizes a resource management system to monitor an individual's activity and dynamically assign non-checkout-related tasks to POS systems during times of expected low or idle usage. When the resource management system determines that an individual is likely to begin a checkout procedure at a particular POS system, the resource management system can communicate instructions to that POS system to pause, reduce, or reallocate some or all non-checkout-related tasks, for example until the checkout procedure is complete. In this way, the resource management system allows for the efficient utilization of the POS system's spare performance while reducing the likelihood of a negative impact on the individual's experience.

The "spare performance" of a POS system can refer to the processing capacity or other resources that are not being fully utilized at a given time. These resources may be available because the POS system is not currently being used by an individual, or because the workload on the system is lower than its maximum capacity. By efficiently utilizing the spare performance of a POS system, the resource management system can improve the overall performance of the retail environment. For example, the resource management system can assign non-checkout-related tasks to a POS system during times when that system is not being used by an individual. This allows the resource management system to make use of the spare performance of the POS system without negatively impacting the individual's experience. If the spare performance of a POS system is not managed carefully, it could potentially have a negative impact on the system's performance or the individual's experience. For example, if too many non-critical tasks are assigned to a POS system, the system may become overloaded and slow down, leading to a negative experience for the individual using the system. To avoid such issues, the resource management system can carefully balance the allocation of resources within the retail environment. By assigning tasks to POS systems based on predictions of individual behavior and analysis of items that are likely to be purchased, the resource management system can ensure that the spare performance of each POS system is used efficiently and does not negatively impact the individual's experience. In this way, the resource management system allows for the efficient utilization of the POS system's spare performance while reducing the likelihood of a negative impact on the individual's experience.

In at least one example, the present disclosure uses image data and a trained neural network to predict when an individual is likely to use a POS system at a retail location. The neural network may be trained to analyze image data of individuals and provide a prediction of their likelihood of participating in a checkout procedure. Based on this prediction, the resource management system can manage the allocation of resources across the different POS systems in the retail location. For instance, during times when little to no interactions with a POS system are expected (and when the CPU is traditionally idle), the resource management system can assign non-checkout-related tasks. As a corollary, during times when interactions with a POS system are expected, the system can reduce or eliminate assignments of non-checkout-related tasks to that POS system to ensure that the checkout procedure on that POS system runs efficiently.

The resource management system ensure can improve efficiency by reducing latency in the performance of tasks on the POS systems. One way to achieve this is by optimizing the allocation of resources within the retail environment. For example, the resource management system can optimize resource allocation by assigning tasks to POS systems based on predictions of individual behavior and analysis of items that are likely to be purchased. By accurately predicting when interactions with a POS system are likely to occur, the resource management system can allocate sufficient resources to that POS system to ensure that the checkout procedure runs smoothly and efficiently. To further reduce latency, the resource management system can prioritize checkout-related tasks over non-checkout-related tasks. This can be achieved by assigning a higher priority to checkout-related tasks and reducing or eliminating assignments of non-checkout-related tasks to POS systems during times when interactions with those systems are expected. This can ensure that the POS system can focus its resources on the most important tasks, improving the overall performance of the retail environment.

Furthermore, the resource management system can improve efficiency by enhancing data migration and retrieval from cloud-based infrastructure. For example, by prioritizing checkout-related tasks over non-checkout-related tasks, the resource management system can ensure that data migration and retrieval from the cloud is more robust. This can be achieved by assigning a higher priority to checkout-related tasks and reducing or eliminating assignments of non-checkout-related tasks to POS systems during times when interactions with those systems are expected. As a result, the resource management system can ensure that data migration and retrieval from the cloud is efficient, with minimal disruption to the operation of the retail environment. This can be important for retailers that rely on cloud-based infrastructure for key business functions, as it helps to ensure that those functions are not disrupted by competing demands on the system's resources.

The present disclosure introduces several features that significantly improve the functioning of POS systems. One such feature is the ability to optimize the allocation of resources within the retail environment. By assigning tasks to POS systems based on predictions of individual behavior and analysis of items that are likely to be purchased, the system can ensure that the POS systems have sufficient resources to handle the expected workload and minimize latency. Another feature of the present disclosure is the ability to enhance data migration and retrieval from cloud-based infrastructure. By prioritizing tasks related to the checkout procedure over non-critical tasks, the system can ensure that data migration and retrieval from the cloud is more robust. This can improve the performance of the POS systems and reduce latency caused by competing demands on the system's resources. In addition, the present disclosure introduces improved flexibility and scalability in the processing of non-checkout-related tasks on POS systems. By allowing non-checkout-related tasks (e.g., NN models) to run concurrently with or alternatively to checkout-related tasks, the POS systems handle additional workloads without negatively impacting their performance or the efficiency of the retail environment or the existing task in the POS system processing pipeline. Overall, these features significantly improve the functioning of POS systems by optimizing resource allocation, enhancing data migration and retrieval, and improving flexibility and scalability in the processing of tasks. Furthermore, the present disclosure reduces the need for dedicated hardware or processors for running the non-checkout-related tasks. Thus, the present application represents a substantial improvement on existing POS systems in general.

Environment Overview

FIG. 1 illustrates an embodiment of a retail environment 100 that includes a network 108, a resource management system 110, and a collection of POS systems 120A, 120B, . . . 120N (individually or collectively referred to as a POS system 120 or POS systems 120). To simplify discussion and not to limit the present disclosure, FIG. 1 illustrates only one resource management system 110, though multiple may be used. Furthermore, it will be appreciated that the retail environment 100 may include any number of POS systems 120, located at the same or different retail locations.

Any of the foregoing components or systems of the retail environment 100 may communicate via the network 108. Although only one network 108 is illustrated, multiple distinct and/or distributed networks may exist. The network 108 can include any type of communication network. For example, the network 108 can include one or more of a wide area network (WAN), a local area network (LAN), a cellular network (e.g., LTE, HSPA, 3G, and other cellular technologies), an ad hoc network, a satellite network, a wired network, a wireless network, and so forth. In some embodiments, the network 108 can include the Internet.

The various components and systems of the retail environment 100 may be implemented on or include a variety of computing devices, such as processors, distributed processing systems, servers, or isolated execution environments (IEEs) like virtual machines or containers. For example, each POS system may include one or more processing devices 122A, 122B, . . . 122N (individually or collectively referred to as a processing device 122 or processing devices 122), which may have one or more IEEs instantiated thereon. These IEEs may share the compute resources of the processing device 122 and can be assigned checkout-related or non-checkout-related tasks. Any of the foregoing components or systems of the retail environment 100 may be combined and/or may include software, firmware, hardware, or any combination(s) of software, firmware, or hardware suitable for the purposes described.

The resource management system 110 is responsible for monitoring the activity of individuals at a retail location and managing an allocation of resources within the retail environment 100 based on this activity. When it is determined that an individual will interact with a first POS system 120A, the resource management system 110 ensures that the first POS system 120A has sufficient processing power for checkout-related tasks, such as scanning items, searching for information associated with the items, or weighing the items. For example, the resource management system 110 may reduce, remove, or terminate assignments of non-checkout-related tasks to the processing device 122A of the first POS system 120A. On the other hand, when it is determined that an individual will not interact with the first POS system 120A, the resource management system 110 assigns excess processing capacity of the processing device 122A to one or more non-checkout-related tasks, such as running intelligent computing solutions. The resource management system 110 can include a behavior prediction system 112, an item analysis system 114, or a task manager 116.

The behavior prediction system 112 can monitor and characterize the activity of individuals in various environments. For example, the system may be used to monitor activity in a retail location, such as a store or shopping mall. In this case, the behavior prediction system 112 can capture or obtain image data of individuals at the retail location using an imaging device. The images may include facial features, body posture, movement patterns, proximity to a particular point-of-sale system, and so on. However, the behavior prediction system 112 is not limited to monitoring activity in a retail location. The system may be used to monitor activity in other types of environments as well, such as office buildings, hospitals, transportation hubs, and so on. In these environments, the system can capture or obtain image data of individuals using a variety of methods. For example, the system may use surveillance cameras, sensors, or other types of imaging devices to capture images of individuals. The system may also use data from other sources, such as wearable devices, social media posts, and so on, to monitor and characterize individual activity. By monitoring and characterizing individual activity in various environments, the behavior prediction system 112 is able to predict the likelihood of an individual interacting with a particular system or performing a particular task. This information can be used to optimize resource allocation and improve the efficiency of the environment in which the system is deployed.

With reference to the retail environment 100, the behavior prediction system 112 can use the image data predict if an individual is likely to use a POS system 120 and if yes, which POS system 120 the individual is likely to use. In some cases, as described in more detail herein, the behavior prediction system 112 implements a trained neural network to make its predictions. For example, the trained neural network may be trained to analyze various aspects of an individual's behavior or appearance as captured in image data. For example, the neural network may be trained to recognize and analyze an individual's facial features, such as their eyes, nose, mouth, and overall facial structure. This can be used to identify and track individuals as they move through the retail environment.

The neural network may be trained to analyze various aspects of an individual's appearance and behavior, such as their facial features, movement patterns, or body posture, including their stance, the position of their arms and legs, and any other visible body movements, in order to make a prediction about their likelihood of participating in a checkout procedure at a particular POS system. For example, the neural network may be trained to recognize certain facial expressions or gestures that are indicative of a person's level of engagement with their surroundings or intention to initiate a checkout process. The neural network may also be trained to recognize body posture or movement patterns that suggest a person is preparing to interact with a POS system, such as reaching for items in their shopping cart or walking towards a particular checkout lane.

The neural network may be trained to recognize and analyze an individual's movement patterns, including their speed, direction, and overall trajectory as they move through the retail environment. This can help to predict an individual's likelihood of approaching a POS system and initiating a checkout procedure.

The neural network may be trained to recognize and analyze an individual's proximity to a particular POS system. For example, the neural network may be able to detect when an individual is standing close to a POS system or moving towards it, indicating a higher likelihood of interaction. For instances, it may be more likely that a person standing directly in front of a POS system will initiate a checkout process than a person standing several feet away. The neural network may be trained to analyze image data of an individual's location and movement within the retail environment in order to determine their proximity to a particular POS system. The behavior prediction system 112 may include or be in communication with an imaging device 118 to capture or otherwise obtain image data of one or more individuals in the retail environment 100. In one example, the imaging device 118 can be positioned anywhere in the retail environment 100, including proximate or in view of one or more of the POS systems 120. For illustration purposes, the imaging device 118 is a Vostok camera. The images captured by the imaging device 118 may include facial features, body posture, movement patterns, proximity to the POS system 120, the contents of an individual's grocery cart, etc.

The trained neural network may be able to analyze image data of an individual and provide a prediction of that individual's likelihood of participating in a checkout procedure at a particular POS system. For example, the behavior prediction system 112 can use image data captured by the imaging device 118 to predict the likelihood of an individual participating in a checkout procedure at a particular POS system. To do this, the system analyzes the images to identify various characteristics of the individual, such as their facial features, body posture, movement patterns, proximity to the POS system, and the contents of their grocery cart. Based on this analysis, the system can make a prediction about the likelihood of the individual interacting with a POS system and make decisions about how to allocate resources across the different POS systems in the retail location. For example, if the behavior prediction system 112 determines that an individual is likely to use a particular POS system, it may allocate additional resources to that system to ensure that it has sufficient capacity to handle the expected workload. On the other hand, if the system determines that an individual is unlikely to use a particular POS system, it may assign excess capacity on that system to non-critical tasks, such as running intelligent computing solutions. In this way, the behavior prediction system 112 uses image data and machine learning techniques to predict the likelihood of an individual participating in a checkout procedure at a particular POS system. By accurately predicting individual behavior, the system can optimize resource allocation and improve the overall performance and efficiency of the retail environment.

This prediction can be made by analyzing various characteristics of the individual, such as their facial features, body posture, and movement patterns. For example, if the neural network recognizes that an individual is approaching a POS system with their arms full of items, and has a determined and purposeful body posture, it may predict that this individual is likely to initiate a checkout procedure at that POS system. On the other hand, if the neural network recognizes that an individual is simply walking past a POS system without stopping and without any items in their hands, it may predict that this individual is not likely to initiate a checkout procedure at that POS system. In addition to analyzing the individual's body posture and movement patterns, the neural network may also take into account the individual's proximity to the POS system, as well as any items they may have in their grocery cart. The prediction of the individual's likelihood of participating in a checkout procedure at a particular POS system can be made by analyzing various characteristics of the individual and integrating this information to make a determination.

The neural network may be trained to consider the contents of a person's grocery cart or basket as a factor in predicting their likelihood of participating in a checkout procedure. For example, a person with a full shopping cart may be more likely to initiate a checkout process than a person with a few items. The neural network may be trained to recognize the number and size of items in a person's cart and use this information to inform its prediction. Furthermore, the neural network also be trained to consider the contents of a person's grocery cart or basket as a factor in the number of resources to assign to a POS system, such as the amount of processing power needed to scan and process the items. For example, more resources may need to be assigned to a POS system used for a full shopping cart than one for a few items.

The prediction made by the behavior prediction system (e.g., by the trained neural network) may include a probability or likelihood that an individual will participate in a checkout procedure at a particular POS system. For example, the prediction may be that there is a 75% chance that the individual will initiate a checkout procedure at the POS system within the next minute, or that there is a 95% chance that the individual will initiate a checkout procedure at the POS system within the next 5 minutes. The prediction may also include a confidence level or score indicating how certain the neural network is about the prediction. For example, the prediction may include a confidence score of 0.8, indicating that the neural network is 80% confident in the prediction. The prediction may also include an estimated time until the individual is expected to initiate the checkout procedure, such as "within the next 30 seconds" or "in 3 minutes." Overall, the prediction made by the trained neural network provides information about the likelihood and timing of an individual participating in a checkout procedure at a particular POS system.

The item analysis system 114 identifies and analyzes items that are expected to be included in a checkout transaction. It does this by examining the contents of an individual's grocery cart, basket, or other items to be checked out. For example, the item analysis system 114 may include or be in communication with the imaging device 118 to capture or otherwise obtain image data of one or more individuals at the retail location and uses this image data to analyze items to be checked out.

The item analysis system 114 can determine item characteristics such as the number of items an individual has for checkout or the size (e.g., dimensions) or weight of these items. In some cases, the item analysis system 114 can estimate how long it will take for the individual to complete a checkout procedure or how much processing power a POS system 120 will need to process the items for checkout. In some cases, the item analysis system 114 uses a trained neural network to make these determinations. The output of the item analysis system 114 can be used by the resource management system 110 (e.g., the task manager 116) to manage the allocation of resources across the different POS systems 120 in the retail location. For example, in some cases, if there are a large number of items to be checked out, the task manager 116 may allocate relatively more resources to ensure a smooth checkout procedure, while relatively fewer resources may be allocated for smaller transactions.

The task manager 116 assigns and manages tasks on the POS systems 120. For example, the task manager 116 can communicate with the behavior prediction system 112, the item analysis system 114, and/or the POS systems 120 to determine and manage the allocation of tasks on the POS systems 120. For example, the task manager 116 receives output from the behavior prediction system 112 and/or the item analysis system 114 and determines when to pause, terminate, reduce, or reallocate tasks across the various POS systems 120 to efficiently utilize excess processing capacity during down times, while concurrently ensuring sufficient capacity is available for checkout-related tasks when needed. In some cases, the task manager 116 may also monitor the performance of the POS systems individually or as a whole to ensure that they are running smoothly and to identify any potential issues that may need to be addressed.

The behavior prediction system 112 monitors and predicts the activity of individuals in the retail environment 100, such as their likelihood of approaching a POS system 120 to begin a checkout procedure. Based on these predictions, the task manager may adjust the processing capacity of a POS system 120 to prioritize checkout-related tasks. In some such cases, if the behavior prediction system 112 predicts that the individual is likely to interact with the first POS system 120A (e.g., begin a checkout procedure), the task manager 116 may increase the processing device's 122A available processing capacity for checkout-related tasks. For example, the task manager 116 may communicate instructions to the first POS system 120A indicating to pause or terminate one, some, or all non-checkout-related tasks. As another example, the task manager 116 may communicate instructions to the first POS system 120A indicating adjust a number of IEEs instantiated on the first POS system 120A. For instance, if the behavior prediction system 112 predicts that the individual is likely to interact with the first POS system 120A, the task manager 116 may instruct the first POS system 120A to terminate or spin down one or more IEEs running non-checkout-related tasks or may instruct the first POS system 120A to instantiate or spin up one or more IEEs for running checkout-related tasks.

The item analysis system 114 determines item characteristics associated with items that an individual has for checkout. For example, the behavior prediction system 112 can estimate the quantity, size, or weight of items, and/or can predict an amount of time or resources needed for the checkout procedure to be performed on these items. In some such cases, based on output from the item analysis system 114, the task manager 116 may modify allocation of tasks to the processing device 122A. For example, based on a determination that the quantity satisfies a first threshold or an estimate time required for the checkout procedure satisfies a time threshold, the task manager 116 may communicate instructions to the first POS system 120A indicating to pause or terminate one, some, or all non-checkout-related tasks, to terminate or spin down one or more IEEs running non-checkout-related tasks, or to instantiate or spin up one or more IEEs for running checkout-related tasks. In some cases, for example if the number of items to be checked out does not satisfy a first threshold, the processing device may be able to handle both checkout-related and non-checkout-related tasks concurrently. In some cases, for example if the number of items to be checked out satisfies a second threshold, the processing device may not have sufficient capacity to handle both checkout-related and non-checkout-related tasks concurrently, or it may be able to handle fewer non-checkout tasks as compared to a situation with fewer items to be checked out.

The POS systems 120 facilitate checkout procedures as described herein. Each POS system 120 may include or be in communication with hardware and software components, such as scanners, printers, and databases, to support the checkout procedure. The POS system 120 may also include a user interface, such as a touch screen or keyboard, to allow individuals to interact with the system during the checkout procedure. The POS system 120 includes a processing device 122 (e.g., a central processing unit (CPU)) to handle checkout-related tasks and non-checkout-related tasks. As described herein, the resource management system 110 can assign tasks to the POS system's processing device 122, allowing it to prioritize and manage the workload. For example, the POS system 120 can receive the assignment of tasks from the resource management system 110 (e.g., the task manager 116).

The POS system 120 is a device that is capable of hosting multiple isolated execution environments, which are separate computing environments that share the resources of the POS system 120. These isolated execution environments can be used for a variety of tasks, such as processing checkout-related tasks or processing non-checkout-related tasks. The POS system 120 may be configured to host a first set of isolated execution environments for processing checkout-related tasks and a second set of isolated execution environments for processing non-checkout-related tasks. The task manager is a system or component that is responsible for managing the isolated execution environments on the POS system 120, including instructing the POS system 120 to terminate, instantiate, or otherwise scale the quantity of isolated execution environments as needed. This allows the POS system 120 to allocate its resources efficiently and effectively, depending on the current workload and the needs of the individual isolated execution environments.

Figure 2:
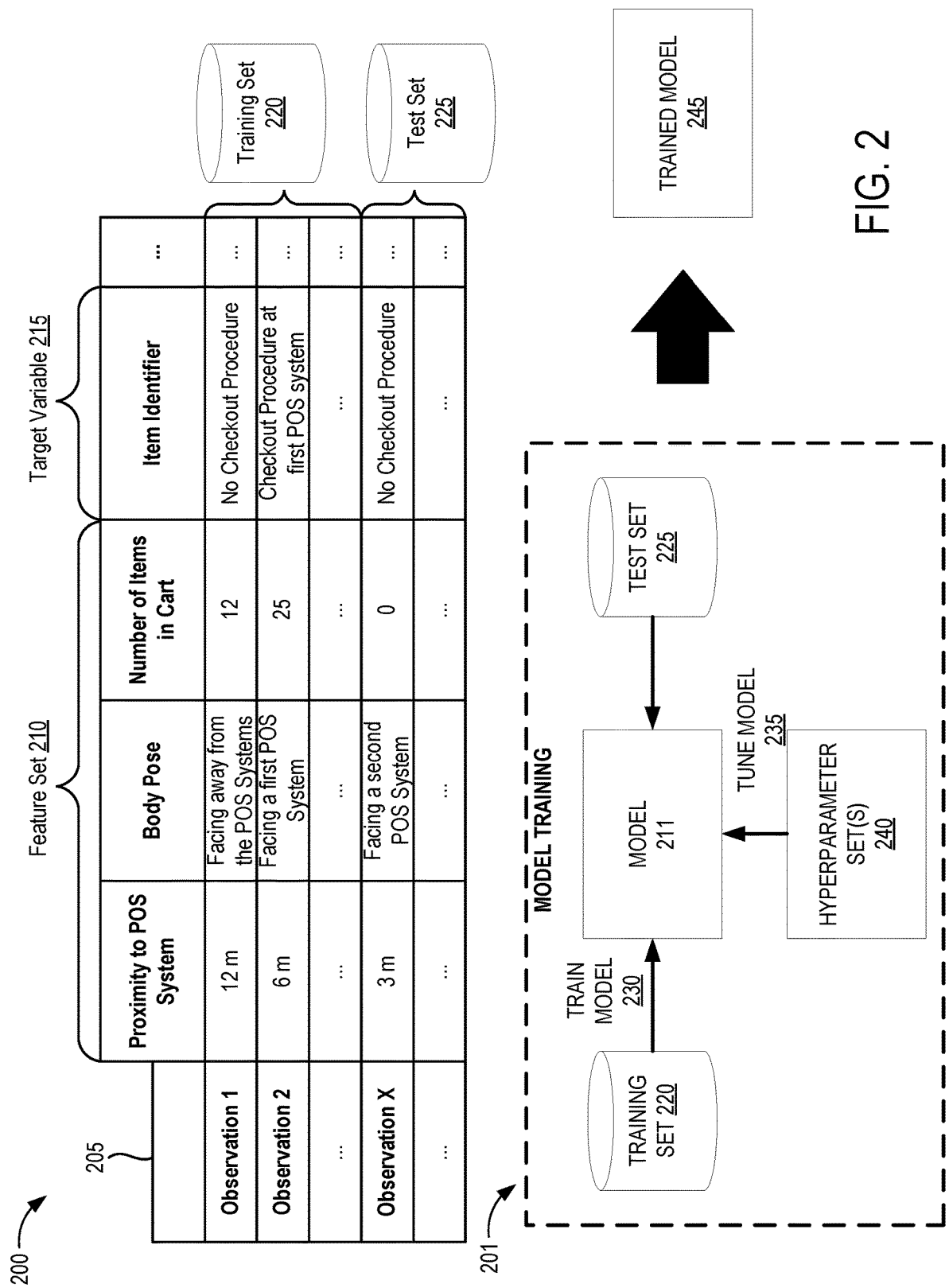
FIG. 2 is a diagram illustrating an example of training a machine learning model in connection with the present disclosure.

FIG. 2 is a diagram 200 illustrating an example of training a machine learning model 211 in connection with the present disclosure. The training of the machine learning model 211 described herein may be performed using a machine learning system 201. The machine learning system 201 may include or may be included in a computing device, a server, a cloud computing environment, or the like, such as the behavior prediction system 112 or the item analysis system 114 of FIG. 1.

As shown by reference number 205, a machine learning model 211 may be trained using a set of observations. The set of observations may be obtained and/or input from historical data, such as data gathered during one or more processes described herein. For example, the set of observations may include data gathered from the behavior prediction system 112, the item analysis system 114, the POS system 120, or another system of the retail environment 100, as described elsewhere herein. In some implementations, the machine learning system 201 may receive the set of observations (e.g., as input) from the behavior prediction system 112, the item analysis system 114, the POS system 120, or from a storage device.

As shown by the feature set 210, a feature set may be derived from the set of observations. The feature set may include a set of variables. A variable may be referred to as a feature. An observation may include a set of variable values corresponding to the set of variables. A set of variable values may be to an observation. In some cases, different observations may be associated with different sets of variable values, sometimes referred to as feature values.

In some implementations, the machine learning system 201 may determine variables for a set of observations and/or variable values for an observation based on input received from the behavior prediction system 112 or the item analysis system 114. For example, the machine learning system 201 may identify a feature set (e.g., one or more features and/or corresponding feature values) from structured data input to the machine learning system 201, such as by extracting data from a particular column of a table, extracting data from a particular field of a form and/or a message, and/or extracting data received in a structured data format. Additionally, or alternatively, the machine learning system 201 may receive input from one or more systems of the behavior prediction system 112 or the item analysis system 114 or from an operator to determine features and/or feature values.

In some implementations, the machine learning system 201 may perform natural language processing and/or another feature identification technique to extract features (e.g., variables) and/or feature values (e.g., variable values) from text (e.g., unstructured data) or image input to the machine learning system 201, such as by identifying keywords and/or values associated with those keywords from the text or images.

As an example, a feature set for a set of observations may include a first feature of Proximity to POS system, a second feature of Body Pose, a third feature of Number of Items in Cart, and so on. As shown, for a first observation, the first feature may have a value of "12 meters", the second feature may have a value of "Facing away from the POS systems", the third feature may have a value of "12", and so on. As another example, a feature set for a set of observations may include a first feature of Proximity to POS system, a second feature of Facial Features, a third feature of Movement Patterns, and so on. As shown, for a first observation, the first feature may have a value of "3 meters", the second feature may have a value of "Smiling", the third feature may have a value of "Steady", and so on. As another example, a feature set for a set of observations may include a first feature of Grocery Cart Contents, a second feature of Body Posture, a third feature of Quickness, and so on. As shown, for a first observation, the first feature may have a value of "Bakery items", the second feature may have a value of "Slouching", the third feature may have a value of "Slow", and so on. These features and feature values are provided as examples and may differ in other examples. For example, the feature set may include one or more of the following features: facial features, body posture, movement patterns, grocery cart contents, age, sex, mobility, quickness, etc.

In some implementations, the machine learning system 201 may pre-process and/or perform dimensionality reduction to reduce the feature set and/or combine features of the feature set to a minimum feature set. A machine learning model 211 may be trained on the minimum feature set, thereby conserving resources of the machine learning system 201 (e.g., processing resources and/or memory resources) used to train the machine learning model 211.

In some cases, the machine learning system 201 can depict an individual's movement or posture from different directions. Coupled with effective score normalization, images from different direction can be integrated to elevate the overall system performance.

The set of observations may be associated with a target variable 215. The target variable 215 may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No, No Checkout Procedure or Checkout Procedure), among other examples. A target variable may be associated with a target variable value, and a target variable value may be associated with an observation. In some cases, different observations may be associated with different target variable values. It will be understood that the target variable may vary across embodiments. For example, in some cases, the target variable 215 is an indication of whether the individual is expected to interact with a POS system, with which POS system the individual is expected interact, how long the individual is expected to take during the checkout procedure, etc.

The target variable may represent a value that a machine learning model 211 is being trained to predict, and the feature set may represent the variables that are input to a trained machine learning model 245 to predict a value for the target variable. The set of observations may include target variable values so that the machine learning model 211 can be trained to recognize patterns in the feature set 210 that lead to a target variable value. A machine learning model that is trained to predict a target variable value may be referred to as a supervised learning model or a predictive model. When the target variable is associated with continuous target variable values (e.g., a range of numbers), the machine learning model 211 may employ a regression technique. When the target variable is associated with categorical target variable values (e.g., classes or labels), the machine learning model 211 may employ a classification technique.

In some implementations, the machine learning model 211 may be trained on a set of observations that do not include a target variable (or that include a target variable, but the machine learning model 211 is not being executed to predict the target variable). This may be referred to as an unsupervised learning model, an automated data analysis model, or an automated signal extraction model. In this case, the machine learning model 211 may learn patterns from the set of observations without labeling or supervision, and may provide output that indicates such patterns, such as by using clustering and/or association to identify related groups of items within the set of observations.

As further shown, the machine learning system 201 may partition the set of observations into a training set 220 that includes a first subset of observations of the set of observations, and a test set 225 that includes a second subset of observations of the set of observations. The training set 220 may be used to train (e.g., fit or tune) the machine learning model 211, while the test set 225 may be used to evaluate a machine learning model 211 that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system 201 may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 25%, among other examples). In some implementations, the machine learning system 201 may randomly select observations to be included in the training set 220 and/or the test set 225.

As shown by reference number 230, the machine learning system 201 may train a machine learning model 211 using the training set 220. This training may include executing, by the machine learning system 201, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model 211 that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system 201 may use one or more hyperparameter sets 240 to tune the machine learning model 211. A hyperparameter may include a structural parameter that controls execution of a machine learning algorithm by the machine learning system 201, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model 211 to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model 211, the machine learning system 201 may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system 201 may tune each machine learning algorithm using one or more hyperparameter sets 240 (e.g., based on operator input that identifies hyperparameter sets 240 to be used and/or based on randomly generating hyperparameter values). The machine learning system 201 may train a particular machine learning model 211 using a machine learning algorithm and a corresponding hyperparameter set 240. In some implementations, the machine learning system 201 may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system 201 may perform cross-validation when training a machine learning model 211. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system 201 may train a machine learning model 211 on the training groups and then test the machine learning model 211 on the hold-out group to generate a cross-validation score. The machine learning system 201 may repeat this training procedure using different hold-out groups and different test groups to generate a cross-validation score for each training procedure. In some implementations, the machine learning system 201 may independently train the machine learning model 211 k times, with each individual group being used as a hold-out group once and being used as a training group k−1 times. The machine learning system 201 may combine the cross-validation scores for each training procedure to generate an overall cross-validation score for the machine learning model 211. The overall cross-validation score may include, for example, an average cross-validation score (e.g., across all training procedures), a standard deviation across cross-validation scores, or a standard error across cross-validation scores.

In some implementations, the machine learning system 201 may perform cross-validation when training a machine learning model 211 by splitting the training set into a number of groups (e.g., based on operator input that identifies the number of groups and/or based on randomly selecting a number of groups). The machine learning system 201 may perform multiple training procedures and may generate a cross-validation score for each training procedure. The machine learning system 201 may generate an overall cross-validation score for each hyperparameter set 240 associated with a particular machine learning algorithm. The machine learning system 201 may compare the overall cross-validation scores for different hyperparameter sets 240 associated with the particular machine learning algorithm and may select the hyperparameter set 240 with the best (e.g., highest accuracy, lowest error, or closest to a desired threshold) overall cross-validation score for training the machine learning model 211. The machine learning system 201 may then train the machine learning model 211 using the selected hyperparameter set 240, without cross-validation (e.g., using all of data in the training set 220 without any hold-out groups), to generate a single machine learning model 211 for a particular machine learning algorithm. The machine learning system 201 may then test this machine learning model 211 using the test set 225 to generate a performance score, such as a mean squared error (e.g., for regression), a mean absolute error (e.g., for regression), or an area under receiver operating characteristic curve (e.g., for classification). If the machine learning model 211 performs adequately (e.g., with a performance score that satisfies a threshold), then the machine learning system 201 may store that machine learning model 211 as a trained machine learning model 245 to be used to analyze new observations, as described below in connection with FIG. 2.

In some implementations, the machine learning system 201 may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system 201 may generate multiple machine learning models, where each machine learning model 211 has the best overall cross-validation score for a corresponding machine learning algorithm. The machine learning system 201 may then train each machine learning model using the training set 220 (e.g., without cross-validation), and may test each machine learning model using the test set 225 to generate a corresponding performance score for each machine learning model. The machine learning model 211 may compare the performance scores for each machine learning model and may select the machine learning model with the best (e.g., highest accuracy, lowest error, or closest to a desired threshold) performance score as the trained machine learning model 245.

As indicated above, FIG. 2 is provided as an example. Other examples may differ from what is described in connection with FIG. 2. For example, the machine learning model 211 may be trained using a different process than what is described in connection with FIG. 2. Additionally, or alternatively, the machine learning model 211 may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
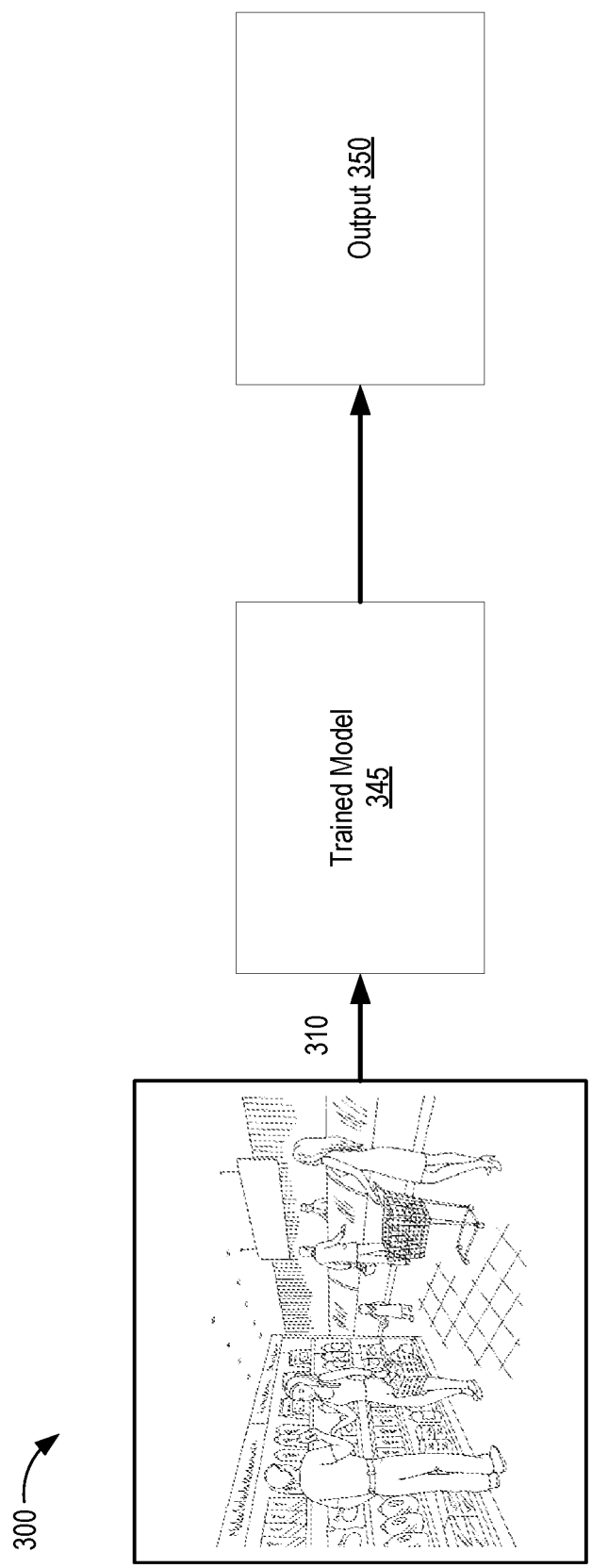
FIG. 3 is a diagram illustrating an example of applying a trained machine learning model to a new observation associated with quantifying a likelihood of an individual participating in a checkout procedure.

FIG. 3 is a diagram illustrating an example 300 of applying a trained machine learning model to a new observation associated with characterizing likelihood of an individual participating in a checkout procedure. The new observation may be input to a machine learning system 201 that stores a trained machine learning model 345. In some implementations, the trained machine learning model 345 may be the trained machine learning model 245 described above in connection with FIG. 2. The machine learning system 201 may include or may be included in a computing device, a server, or a cloud computing environment, such as the behavior prediction system 112 or the item analysis system 114 of FIG. 1.

As shown by reference number 310, the machine learning system 201 may receive a new observation (or a set of new observations) and may input the new observation to the machine learning model 345. As described with respect to FIG. 2, the new observation may include, for example, a first feature of Proximity to POS system, a second feature of Body Pose, a third feature of Number of Items in Cart, and so on.

The machine learning system 201 may apply the trained machine learning model 345 to the new observation to generate an output 350, such as a result indicating an identifier of a POS system expected to be interacted with. The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model 345 and/or observations used to train the machine learning model), such as when unsupervised learning is employed. In some implementations, the output 350 includes an indication of an identity of the POS system. For example, the output can correspond to a "best guess" for whether the individual will perform a checkout procedure at a POS system, based on the input features. Furthermore, as described herein, in some cases, the output 350 includes a confidence value for the output.

In some implementations, the trained machine learning model 345 may predict a value of "POS system #1" and "96%" for the target variable for the new observation, indicating that there is a 96% likelihood that an individual will soon interact with POS system #1 to perform a checkout procedure. Based on this prediction (e.g., based on the value having a particular label or classification or based on the value satisfying or failing to satisfy a threshold), the machine learning system 201 may provide a recommendation and/or output for determination of a recommendation, such a recommendation to manage the allocation of resources of POS system #1, among other examples. Additionally, or alternatively, the machine learning system 201 may perform an automated action and/or may cause an automated action to be performed (e.g., by instructing another device to perform the automated action), such as causing termination of non-checkout-related tasks at the POS system #1.

As another example, if the machine learning system 201 were to predict a value of "LOW" for a target variable of "confidence value", then the machine learning system 201 may provide a different recommendation and/or may perform or cause performance of a different automated action (e.g., output an indication to manually review). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In this way, the machine learning system 201 may apply a rigorous and automated process to identify if an individual will participate in a checkout procedure and, if so, which POS system the individual is likely to use. The machine learning system 201 enables recognition and/or identification of tens, hundreds, thousands, or millions of features and/or feature values for tens, hundreds, thousands, or millions of observations, thereby increasing accuracy and consistency and reducing delay associated with the relative resources (e.g., computing or human) required to be allocated for tens, hundreds, or thousands of operators to manually identify an individual's actions and manually manage the resources of the POS system. As indicated above, FIG. 3 is provided as an example. Other examples may differ from what is described in connection with FIG. 3.

Figure 4:
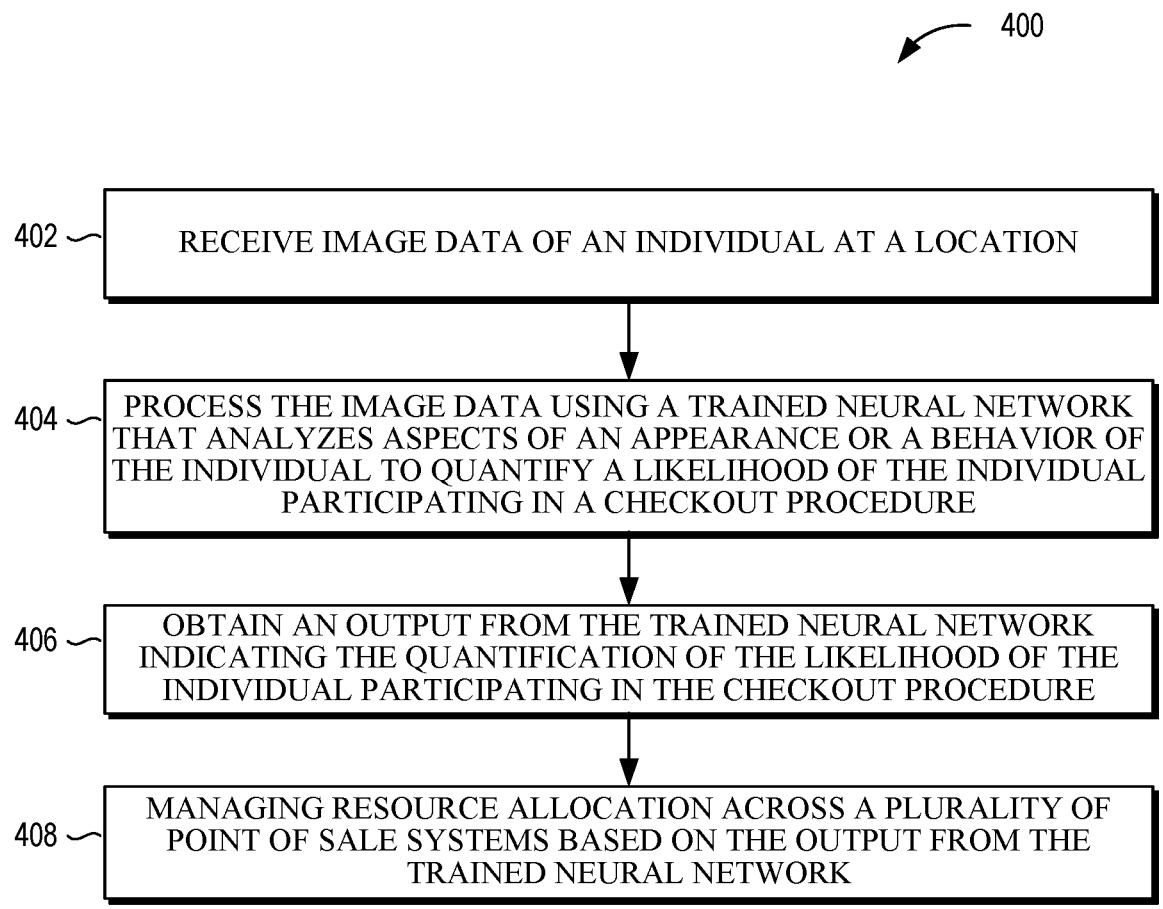
FIG. 4 is a flow diagram illustrative of an embodiment of a process for managing resource allocation in a retail environment.

FIG. 4 is a flow diagram illustrative of an embodiment of a process 400 for managing resource allocation in a retail environment. Although described as being implemented by the resource management system 110, it will be understood that the elements outlined for process 400 can be implemented by one or more computing devices or components that are associated with the retail environment 100, such as, but not limited to, the behavior prediction system 112, the item analysis system 114, the task manager 116, or a POS system 120, etc. Thus, the following illustrative embodiment should not be construed as limiting.

At block 402, the resource management system 110 receives image data of one or more individuals at a location, such as at a retail location. The image data can be captured using one or more imaging devices such as cameras or video cameras located at various locations within the retail environment 100, such as at the entrance, in the aisles, or near the POS systems 120. The image data may include multiple images, such as concurrent images from different angles or from multiple areas of the retail environment 100 and may include images or videos of a single individual, a group of individuals, or items, such as those in a cart or basket. The retail environment 100 may be similar to the retail environment 100 in that it includes a plurality of POS systems 120 for facilitating transactions and enabling individuals to make purchases. Each POS system 120 may include a processing unit for handling tasks various tasks, such as checkout-related tasks or non-checkout related tasks, as described herein.

At block 404, the resource management system 110 inputs the image data into one or more trained neural networks in order to analyze and make predictions about retail store operations. A first neural network (e.g., associated with the behavior prediction system 112) is trained to process the image data and analyze aspects of an appearance or a behavior of the individual to quantify a likelihood of the individual participating in a checkout procedure at a POS system. This prediction or quantification can be based on the neural network's analysis of the image data, which may include identifying features or patterns in the images that are indicative of an individual's intention to check out. Additionally, the first neural network may be trained to predict which POS system the individual is likely to use, based on the image data and other relevant information.

In some cases, the likelihood that an individual will participate in a checkout procedure at a POS system can be predicted based on the expected timing of their interaction with the POS system. If it is predicted that the individual will interact with the POS system within a certain threshold period of time, such as within 5 seconds, 15 seconds, 30 seconds, or 1 minute, it is likely that they will initiate a checkout process. This prediction can be made using image data and other relevant information input into a trained neural network, which has been designed to analyze the likelihood of individuals participating in checkout procedures.

A second neural network (e.g., associated with the item analysis system 114) is trained to analyze image data in order to determine characteristics of items an individual has for checkout, such as the number of items or their size or weight. The second neural network uses its analysis of the image data to identify features or patterns that are indicative of the number, size, or weight of the items. In addition or as an alternative, the second neural network may estimate the amount of time required for a checkout procedure based on the determined characteristics and/or the resources needed by a POS system to facilitate the transactions for those items. In some cases, a POS system may require more resources for transactions with more items or may require more resources at different stages of the checkout process, such as during the initial scanning of items. Overall, the second neural network uses its analysis of the image data to make predictions about the resources needed for a smooth checkout process.

The inputs to the neural networks may vary depending on the embodiment. For example, the image data may be processed in various ways, such as being rotated or scaled, before being input into a neural network. This processing may be to ensure that the image data is consistent and reliable, and to remove any distractions or noise that may interfere with the neural network's analysis. Additionally, the inputs may include timestamps associated with the image data, which can be used along with historical data to predict the level of activity at the retail environment 100. The timestamps can provide information about the time of day, day of the week, and other factors that may impact the number of individuals present in the store and the likelihood of their participation in a checkout procedure. The inputs may also include information about which POS systems, if any, are currently out of order, which can impact the allocation of resources. Overall, the trained neural networks use the image data and other inputs to make predictions and inform resource management decisions. In some cases, the resource management system 110 utilizes one or both of the first and second neural networks. In some cases, the function of the first and second neural networks are combined into a combined neural network. For example, the first and second neural networks can be used to further optimize resource allocation by ensuring that sufficient processing power is available for checkout tasks when needed.

At block 406, the resource management system 110 obtains an output from the trained neural network(s). The output may include information about whether an individual will participate in a checkout procedure at a POS system, which individual it is (e.g., an individual identifier), which POS system the individual is likely to use, an estimated time until the POS system will be used, an estimated duration that the POS system will be used, an estimated processing requirement to perform the checkout procedure at the POS system, etc. For example, the output may indicate that an individual is likely to initiate a checkout procedure at POS system 1 within the next 15 seconds, or that individual A is likely to initiate a checkout procedure at POS system 1 within the next 5 seconds, while individual B is likely to initiate a checkout procedure at POS system 2 within the next 35 seconds. In some cases, the output may additionally or alternatively include detailed information about the items that the individual has for checkout, such as the number of items and their size or weight. This information can be useful for predicting the workload required to process the items during the checkout procedure and for allocating resources accordingly, such as by assigning additional staff or equipment if the output indicates a large number of heavy items. In other cases, the output may indicate that no POS systems will be used within a threshold period of time, or that the checkout procedure for an individual is likely to last 3 minutes based on the number and characteristics of the items they have for checkout. Overall, the output from the trained neural network provides valuable insights and predictions about the retail store's operations.

At block 408, the resource management system 110 uses the output from the trained neural network(s) to manage resource allocation across the POS systems 120 in the retail environment 100. As described herein, this may involve dynamically assigning non-checkout related tasks to a first POS system 120A if the output indicates that the individual is not expected to take part in the checkout procedure at that device. On the other hand, if the output indicates that the individual is expected to participate in the checkout procedure at the first POS system 120A, the resource management system 110 may assign checkout-related tasks to that device or terminate non-checkout related tasks.

The resource management system 110 may also use data indicating the availability of the POS systems and the performance capabilities of the POS systems 120 to manage resource allocation. For example, if a POS system 120 has a higher performance capability or is expected to be idle for a longer period of time, the resource management system 110 may assign more tasks to that system.

In some embodiments, the resource management system 110 may utilize a collection of isolated execution environments (IEEs) that are instantiated on the processing devices 122 in a shared computing resource environment. These IEEs can perform the tasks for the processing devices 122. In some such cases, if the output from the trained neural network indicates that the individual is expected to participate in the checkout procedure at a particular POS system, the resource management system 110 may reassign a non-checkout related task executing on an isolated execution environment on that POS system to a second isolated execution environment on a different POS system. This may involve instantiating an additional isolated execution environment on the second POS system.

The resource management system 110 may also receive data indicating the availability of the POS systems and data indicating the performance capabilities of the POS systems 120 in order to manage resource allocation. For example, if a POS system is expected to be busy with an individual's interactions, the resource management system 110 may ensure that sufficient processing power is available for checkout tasks by reducing or eliminating assignments of non-checkout related tasks to that system. On the other hand, if a POS system is expected to be idle for a longer period of time, the resource management system 110 may assign additional tasks to that system in order to make efficient use of its excess processing capacity.

It will be understood that the various blocks described with respect to FIG. 4 can be implemented in a variety of orders and/or can be implemented concurrently or in an altered order, as desired. For example, in some cases, the process 400 can be concurrently performed for multiple individuals or POS systems, such as tens, hundreds, or thousands of individuals or POS systems. Furthermore, it will be understood that fewer, more, or different blocks can be used as part of the process 400 of FIG. 4.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the routines described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, rather than sequentially.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

As used herein, the term "component" is intended to be broadly construed as hardware, firmware, or a combination of hardware and software.

These and other changes can be made to the present disclosure in light of the above Detailed Description. While the above description describes certain examples of the present disclosure, and describes the best mode contemplated, no matter how detailed the above appears in text, the present disclosure can be practiced in many ways. Details of the system may vary considerably in its implementation, while still being encompassed by the present disclosure disclosed herein. As noted above, particular terminology used when describing certain features or aspects of the present disclosure should not be taken to imply that the terminology is being redefined herein to be restricted to any characteristics, features, or aspects of the present disclosure with which that terminology is associated. In general, the terms used in the following claims should not be construed to limit the present disclosure to the examples disclosed in the specification, unless the above Detailed Description section explicitly defines such terms. Accordingly, the actual scope of the present disclosure encompasses not only the disclosed examples, but also all equivalent ways of practicing or implementing the present disclosure under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. A method comprising:
    receiving image data of an individual at a location, wherein the location comprises a plurality of point-of-sale (POS) systems at a retail location;
    processing the image data using a first trained neural network, wherein the first trained neural network analyzes aspects of an appearance or a behavior of the individual as captured in the image data to quantify a likelihood of the individual participating in a checkout procedure at a first POS system of the plurality of POS systems;
    obtaining a first output from the first trained neural network indicating a quantification of the likelihood of the individual participating in the checkout procedure at the first POS system, wherein obtaining comprises applying a machine learning classification model that outputs a probability score representing a confidence that the individual will initiate the checkout procedure at the first POS system within a defined prediction window;
    predicting, by the first trained neural network, that the individual will participate in the checkout procedure based at least in part on a determination that the individual will interact with the first POS system within a threshold period of time;
    inputting the image data into a second trained neural network configured to determine characteristics of items associated with the individual;
    obtaining, from the second trained neural network, a second output indicating one or more of a quantity of the items, or a size one or more of the items, or a weight of one or more of the items; and
    managing, via a resource management system communicatively coupled to the plurality of POS systems via a network, resource allocation across the plurality of POS systems based on the first output from the first trained neural network and the second output from the second trained neural network, wherein managing comprises managing an allocation of processing resources among checkout-related tasks and non-checkout-related tasks assigned to the plurality of POS systems, wherein managing resource allocation comprises at least one of:
        assigning a checkout-related task to the first POS system, wherein the checkout-related task comprises at least one of scanning an item, searching for information associated with the item, or weighing the item,
        unassigning a non-checkout-related task from the first POS system, wherein the non-checkout-related task comprises running at least a portion of a third trained neural network model configured to facilitate at least one of produce recognition during a checkout procedure or theft detection,
        terminating an isolated execution environment instantiated on the first POS system, the isolated execution environment being configured to perform the non-checkout-related task, or
        assigning the first POS system to perform a non-checkout-related task based on a determination that the individual is not expected to interact with the first POS system, wherein the resource management system communicates with the plurality of POS systems over a network interface.

2. The method of claim 1, wherein based on the first output indicating that the individual is not expected to take part in the checkout procedure at the first POS system, managing comprises at least one of unassigning a checkout-related task to the first POS system, assigning a non-checkout-related task to the first POS system, or instantiating an isolated execution environment on the first POS system, the isolated execution environment configured to perform the non-checkout-related task.

3. The method of claim 1, wherein based on the first output indicating that the individual is expected to take part in the checkout procedure at the first POS system, managing includes at least one of assigning a checkout-related task to the first POS system, unassigning a non-checkout-related task to the first POS system, or terminating an isolated execution environment instantiated on the first POS system, the isolated execution environment configured to perform the non-checkout-related task.

4. The method of claim 1, wherein the characteristics comprise a quantity of the items or a size or weight of one or more of the items.

5. The method of claim 1, wherein processing the image data comprises analyzing at least one of a facial expression, a body posture, a movement trajectory, or a proximity of the individual to the first POS system using the first trained neural network.

6. The method of claim 1, wherein managing comprises reallocating at least one non-checkout-related task from the first POS system to a second POS system by instantiating an isolated execution environment on the second POS system.

7. The method of claim 1, wherein predicting that the individual will participate in the checkout procedure comprises determining that a confidence score satisfies a dynamic threshold value based on a time of day or observed traffic conditions at the retail location.

8. The method of claim 1, wherein managing further comprises adjusting a number of isolated execution environments instantiated on the first POS system to increase processing availability for checkout-related tasks.

9. The method of claim 1, wherein obtaining the output from the second trained neural network comprises estimating a processing time required to complete the checkout procedure based at least in part on the quantity, size, or weight of the items.

10. A system, comprising:
    one or more processors communicatively to multiple POS systems located at a retail location, the one or more processors configured to:

receive image data of an individual at a location, wherein the location comprises a plurality of point-of-sale (POS) systems;
process the image data using a first trained neural network, wherein the first trained neural network analyzes aspects of an appearance or a behavior of the individual as captured in the image data to quantify a likelihood of the individual participating in a checkout procedure at a first POS system of the plurality of POS systems;
obtain a first output from the first trained neural network indicating a quantification of the likelihood of the individual participating in the checkout procedure at the first POS system, wherein obtaining comprises applying a machine learning classification model that outputs a probability score representing a confidence that the individual will initiate the checkout procedure at the first POS system within a defined prediction window;
predict, by the first trained neural network, that the individual will participate in the checkout procedure based at least in part on a determination that the individual will interact with the first POS system within a threshold period of time;
input the image data into a second trained neural network configured to determine characteristics of items associated with the individual;
obtain, from the second trained neural network, a second output indicating one or more of a quantity of the items, or a size one or more of the items, or a weight of one or more of the items; and
manage, via a resource management system communicatively coupled to the plurality of POS systems via a network, resource allocation across the plurality of POS systems based on the first output from the first trained neural network and the second output from the second trained neural network, wherein management comprises managing an allocation of processing resources among checkout-related tasks and non-checkout-related tasks assigned to the plurality of POS systems, and wherein the management includes unassigning a non-checkout-related task from the first POS system or assigning a checkout-related task to the first POS system.

11. The system of claim 10, wherein the first output indicates that the individual is not expected to take part in the checkout procedure at the first POS system, and wherein the one or more processors are configured to at least one of unassign a checkout-related task to the first POS system, assign a non-checkout-related task to the first POS system, or instantiate an isolated execution environment on the first POS system, wherein the isolated execution environment configured to perform the non-checkout-related task.

12. The system of claim 10, wherein the first output indicates that the individual is expected to take part in the checkout procedure at the first POS system, and wherein the one or more processors are configured to at least one of assign a checkout-related task to the first POS system, unassign a non-checkout-related task to the first POS system, or terminate an isolated execution environment instantiated on the first POS system, wherein the isolated execution environment configured to perform the non-checkout-related task.

13. The system of claim 10, wherein the checkout-related tasks include tasks associated with at least one of scanning an item, searching for information associated with the item, or weighing the item.

14. The system of claim 10, wherein the non-checkout-related tasks include running at least a portion of a trained neural network model, wherein the trained neural network model facilitates at least one of produce recognition during a checkout procedure or theft detection.

15. Non-transitory computer-readable media storing computer executable instructions that when executed by one or more processors cause the one or more processors to:
receive image data of an individual at a location, wherein the location comprises a plurality of point-of-sale (POS) systems;
process the image data using a first trained neural network, wherein the first trained neural network analyzes aspects of an appearance or a behavior of the individual as captured in the image data to quantify a likelihood of the individual participating in a checkout procedure at a first POS system of the plurality of POS systems;
obtain a first output from the first trained neural network indicating a quantification of the likelihood of the individual participating in the checkout procedure at the first POS system, wherein obtaining comprises applying a machine learning classification model that outputs a probability score representing a confidence that the individual will initiate the checkout procedure at the first POS system within a defined prediction window;
predict, by the first trained neural network, that the individual will participate in the checkout procedure based at least in part on a determination that the individual will interact with the first POS system within a threshold period of time;
input the image data into a second trained neural network configured to determine characteristics of items associated with the individual;
obtain, from the second trained neural network, a second output indicating one or more of a quantity of the items, or a size one or more of the items, or a weight of one or more of the items; and
manage, via a resource management system communicatively coupled to the plurality of POS systems via a network, resource allocation across the plurality of POS systems based on the first output from the first trained neural network and the second output from the second trained neural network, wherein management comprises managing an allocation of processing resources among checkout-related tasks and non-checkout-related tasks assigned to the plurality of POS systems, and wherein the management includes unassigning a non-checkout-related task from the first POS system or assigning a checkout-related task to the first POS system.

16. The non-transitory computer-readable media of claim 15, wherein the output indicates that the individual is not expected to take part in the checkout procedure at the first POS system, and wherein the one or more processors are configured to at least one of unassign a checkout-related task to the first POS system, assign a non-checkout-related task to the first POS system, or instantiate an isolated execution environment on the first POS system, wherein the isolated execution environment configured to perform the non-checkout-related task.

17. The non-transitory computer-readable media of claim 15, wherein the output indicates that the individual is expected to take part in the checkout procedure at the first POS system, and wherein the one or more processors are configured to at least one of assign a checkout-related task to the first POS system, unassign a non-checkout-related task to the first POS system, or terminate an isolated execution environment instantiated on the first POS system, wherein the isolated execution environment configured to perform the non-checkout-related task.

* * * * *